US012419451B2

(12) United States Patent
Nolimal

(10) Patent No.: US 12,419,451 B2
(45) **Date of Patent: *Sep. 23, 2025**

(54) PRE-FILLED DRINKING STRAW WITH A CROSS-SLIT VALVE CLOSURE ON BOTH ENDS

(71) Applicant: Alterno Labs D.O.O., Crnuce (SI)

(72) Inventor: Boris Nolimal, Ljubljana (SI)

(73) Assignee: Alterno Labs d.o.o., Ljubljana-Crnuce (SI)

(*) Notice: Subject to any disclaimer, the term of this patent is extended or adjusted under 35 U.S.C. 154(b) by 486 days.

This patent is subject to a terminal disclaimer.

(21) Appl. No.: 16/624,694

(22) PCT Filed: Jun. 20, 2017

(86) PCT No.: PCT/EP2017/065115
§ 371 (c)(1),
(2) Date: Dec. 19, 2019

(87) PCT Pub. No.: WO2018/233816
PCT Pub. Date: Dec. 27, 2018

(65) Prior Publication Data
US 2020/0113363 A1 Apr. 16, 2020

(51) Int. Cl.
*A47G 21/18* (2006.01)
*A61J 7/00* (2006.01)

(52) U.S. Cl.
CPC ........... *A47G 21/18* (2013.01); *A47G 21/183* (2013.01); *A61J 7/0038* (2013.01); *A47G 2400/027* (2013.01)

(58) Field of Classification Search
CPC .................. A47G 21/18; A47G 21/183; A47G 2400/027; A61J 7/0038; B29L 2023/008;
(Continued)

(56) References Cited

U.S. PATENT DOCUMENTS 1,254,115 A * 1/1918 Brand .................. A47G 21/183 206/217
5,718,681 A 2/1998 Manning
(Continued)

FOREIGN PATENT DOCUMENTS

| | | |
|---|---|---|
| CA | 2230851 | 3/1997 |
| CN | 2538333 Y | 3/2003 |

(Continued)

OTHER PUBLICATIONS

International Search Report mailed Feb. 14, 2018, issued in corresponding International Application No. PCT/EP2017/065115, filed Jun. 20, 2017, 3 pages.

(Continued)

*Primary Examiner* — Ericson M Lachica
(74) *Attorney, Agent, or Firm* — Christensen O'Connor Johnson Kindness PLLC

(57) ABSTRACT

The invention is characterized in that the straw body (1) is consisting of two or more segments, which are attached together with connection (5) and that the straw body (1) on its both ends has a cross-slit valve (2, 3) closure and the valves (2, 3) and the straw body (1) are integrated by molecular adhesion. The inlet and outlet valves (2, 3) are of a slit type. The straw body (1) is preferably made of a thermoplastic material and the valves (2, 3) are preferably made of elastomer material. The edge of the straw body (1) is shaped to enable larger surface of the connection between the straw body (1) and the valve (2, 3). The said shape is preferably a groove (8). On the wall on the end of the straw body (1) a tongue-shaped groove (9) is formed on the surface side.

21 Claims, 6 Drawing Sheets

(58) Field of Classification Search
CPC .. B29C 45/0441; B29C 45/14; B29K 2101/12
See application file for complete search history.

(56) References Cited

U.S. PATENT DOCUMENTS

| | | | | |
|---|---|---|---|---|
| 5,820,023 | A * | 10/1998 | Kristensson | B65D 77/28 239/33 |
| 9,609,969 | B1 * | 4/2017 | Panec | F16K 21/04 |
| 10,987,278 | B2 * | 4/2021 | Nolimal | A61J 7/0038 |
| 2003/0006159 | A1 * | 1/2003 | Thorball | A61M 5/1407 206/438 |
| 2003/0071136 | A1 | 4/2003 | Ference | |
| 2007/0059409 | A1 * | 3/2007 | Catani | A47G 21/183 426/134 |
| 2007/0262164 | A1 | 11/2007 | Gelfand | |
| 2010/0063473 | A1 | 3/2010 | Schwarz et al. | |
| 2010/0092309 | A1 | 4/2010 | Hockemeier | |
| 2010/0159075 | A1 | 6/2010 | Baron | |
| 2010/0221389 | A1 * | 9/2010 | Frenken | B65D 77/28 426/74 |
| 2011/0108613 | A1 * | 5/2011 | Stribling | B65D 77/28 229/103.1 |
| 2012/0247993 | A1 * | 10/2012 | Palazzi | A61K 35/747 424/93.46 |
| 2012/0301579 | A1 | 11/2012 | Lee et al. | |
| 2013/0029523 | A1 | 1/2013 | Poma et al. | |
| 2013/0277449 | A1 * | 10/2013 | Alon | A47G 21/183 239/33 |
| 2014/0166680 | A1 * | 6/2014 | St. Gelais | A47G 21/183 220/710 |
| 2014/0191060 | A1 * | 7/2014 | Hanners | A47G 21/18 239/33 |
| 2019/0059624 | A1 * | 2/2019 | Kazmierczak, III | A47G 21/186 |
| 2020/0060456 | A1 * | 2/2020 | Ehizuelen | A47G 21/182 |
| 2020/0288894 | A1 * | 9/2020 | Kulkarni | B65D 85/72 |
| 2020/0352368 | A1 * | 11/2020 | Rees | B65D 51/16 |

FOREIGN PATENT DOCUMENTS

| | | | |
|---|---|---|---|
| CN | 1655694 | A | 8/2005 |
| CN | 101432118 | A | 5/2009 |
| CN | 201254277 | Y | 6/2009 |
| CN | 201577978 | U | 9/2010 |
| CN | 201767666 | U | 3/2011 |
| CN | 202653800 | U | 1/2013 |
| CN | 103040628 | A | 4/2013 |
| CN | 103284451 | A | 9/2013 |
| CN | 103289190 | A | 9/2013 |
| CN | 103549853 | A | 2/2014 |
| CN | 204378751 | U | 6/2015 |
| EP | 0383503 | A1 | 8/1990 |
| JP | 2002-345619 | A | 12/2002 |
| JP | 2015-501544 | A | 1/2015 |
| KR | 10-2010-0092682 | A | 8/2010 |
| WO | 97/08979 | A1 | 3/1997 |
| WO | 2004/100859 | A1 | 11/2004 |
| WO | 2008/055296 | A1 | 5/2008 |
| WO | 2008/072060 | A1 | 6/2008 |
| WO | 2010/054439 | A1 | 5/2010 |
| WO | 2014/199957 | A1 | 12/2014 |
| WO | 2015/186454 | A1 | 12/2015 |

OTHER PUBLICATIONS

Written Opinion of the International Searching Authority mailed Feb. 14, 2018, issued in corresponding International Application No. PCT/EP2017/065115, filed Jun. 20, 2017, 5 pages.

* cited by examiner

PRE-FILLED DRINKING STRAW WITH A CROSS-SLIT VALVE CLOSURE ON BOTH ENDS

The present disclosure relates to a pre-filled straws and a process of manufacturing the same. Such straws may be used for oral administration of liquid soluble ingredients, preferably granules, preferably for oral drugs administration. To administer the ingredient which is pre-filled in the straw, the straw has to be with its lower end inserted into the liquid, its upper end is inserted into the mouth and the liquid is sucked. Sucked liquid dissolves the ingredient and the solution is applied to the user.

Known pre-filled straws are described in patent documents. In US 2003/0071136 A1 a straw is described with one valve closure impressed into the body of the straw. In CA 2230851 a drink container is described with mouthpiece with inserted valve. Valves and/or filters are added to the straw, meaning that straws and valves and optionally filters are produced separately and the straw is assembled from separate parts in later. The known designs of the straws use one way valves on either inlet or outlet, and use different types of closures, i.e. caps, grids and/or filters of different mesh sizes as closures of other opening. Generally, the straw is assembled from the straw body and the closure mechanism which is inserted into the straw—either valve or filter or other form of barrier. This leads to additional assembly steps in production as well as to a need for the use of additional design features preventing closure to fall out of the straw before or during use.

The present invention seeks to reduce the above mentioned problem by providing a pre-filled straw with cross-slit valve closures on both ends whereby the straw and the straw-valves are integrated in one-piece. The proposed design allows easier production of the straw and its filling. The pre-filled straw according to the invention may enable easier production of the straw by multi-component injection moulding, i.e. the injection of elastomeric valves onto the polymer straw body.

Embodiments of the present invention will be described with the references to the drawings, in which.

Figure 1:
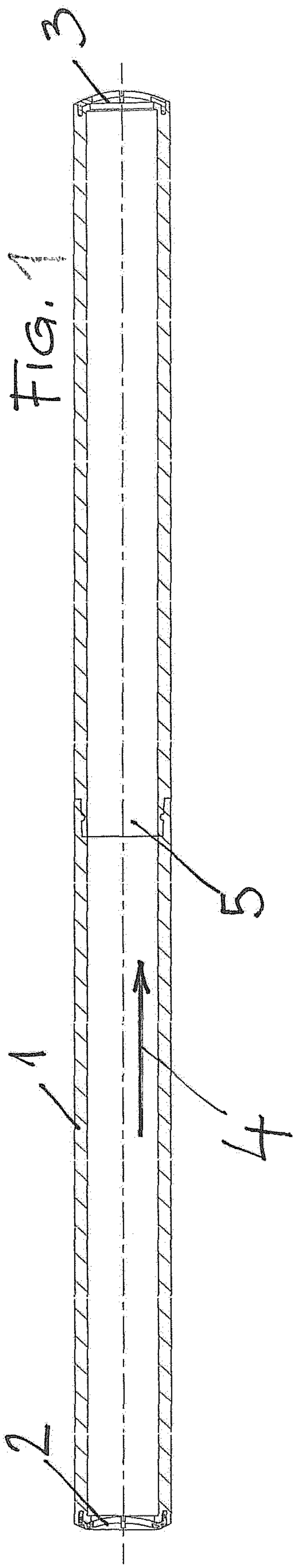
FIG. 1 shows the straw body.

The parts of a pre-filled straw as presented in FIG. 1 are a main straw body 1 in tubular form, which may be round or oblong shape and two cross slit valves 2, 3. The main straw body includes at least two straw segments, each having a straw body and a respective valve at one end. Valve 2 is positioned on the liquid inlet and valve 3 on the outlet of the straw. The valves 2, 3 are positioned in the way to allow only one-way flow through the body straw, as presented by arrow 4 in FIG. 1. The valves 2, 3 are initially in a closed position, but when suction in the direction of the arrow 4 is applied, both of them are opened and allow the liquid to enter the straw. When suction is stopped, both valves 2, 3 return to a closed position.

The invention can be applied to straws consisting of two or even more than two segments. In the arrangement shown in FIG. 2, the straw has two straw segments, each with a respective valve 2, 3 at one end of the segment. The two straw segments are directly coupled to each other. In other arrangements, the two straw segments having a valve at one end may be coupled to each other indirectly, for example by way of one or more additional straw segments.

The segments are coupled together with a coupling 5. Such couplings may be formed from two elements formed, each formed at an end of a respective straw segment. The elements on each segment are configured such that the element on one straw segment can engage with the element on another straw segment to couple the straw segments together. In such a way the straw segments can be coupled together after the straw segments have been formed. This is in contrast with the valves, which may be integrally formed as part of the straw segment.

Figure 2:
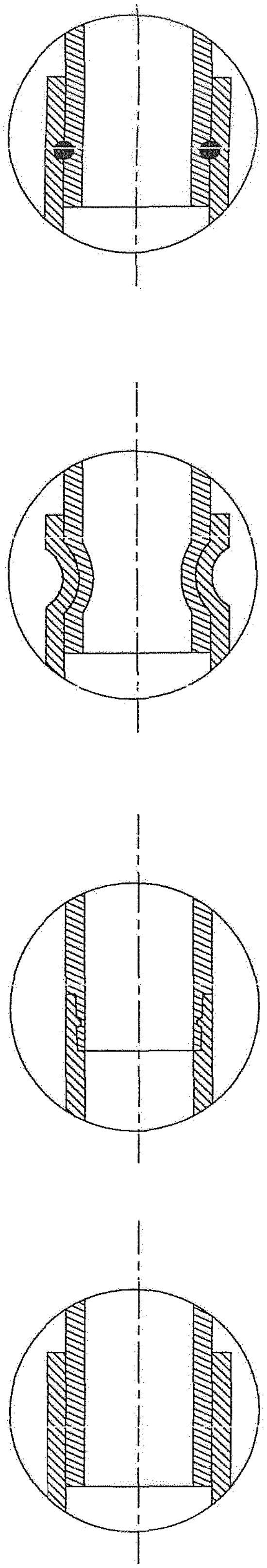
FIG. 2 shows examples of couplings between segments of a straw body.

Several types of coupling are depicted in FIG. 2 that may be used to couple the straw segments. Straw segments may, for example, be attached one to another by a friction fit connection, i.e. one part is slightly narrower than the other, a snap-fit connection, a press-fit connection, a weld, a section of adhesive or another suitable coupling. A snap-fit connection may be an annular snap joint, or capsule like closing system, in which one straw segment has a U-shaped annular groove around the cross-section of the straw segment that, when the straw segments are coupled, receives corresponding protrusion on the other straw segment.

The thickness of the wall of the straw segment may be increased in the region of the coupling. This may increase the strength, reduce the risk of cracking and/or make it easier to mould the elements of the coupling.

Once the coupling has been completed, it may be configured to be not possible to detach the straw segments without damage. Alternatively the coupling may be configured to be detachable, permitting a user to open the straw to pour and/or wash out the contents.

In an arrangement the coupling between the straw segments may provide a gas tight, or hermetic, seal. This may ensure that, when a user sucks on one end of the straw, pressure is sufficiently reduced within the straw to draw liquid into the other end of the straw. Depending on the coupling used, an O-ring may be provided in order to ensure a good seal between the straw segments.

As depicted in FIG. 1, first and second straw segments coupled together to form a pre-filled straw may have the same length. Alternatively, the two straw segments may have different lengths. For example, it may be desirable for one segment to be longer than the other. This may be beneficial if product is to be placed in only one of the straw segments prior to coupling the two straw segments together because this may permit a greater amount of product to be placed within the pre-filled straw for a given total length of pre-filled straw. However, longer straw segments are more difficult to form due to cooling of the mould during straw formation. Accordingly, the length of a straw segment containing the product during preparation of the pre-filled straw need to be smaller than the length of the overall pre-filled straw.

In general, the choice of total length of pre-filled straw may be a compromise. It may be selected to be long enough to be convenient for a user to ensure that it reaches liquid in the bottom of a cup. However, the longer the straw, the harder the user must suck to draw up liquid into their mouth. Furthermore, longer straws cost more to manufacture and take up more space in storage and transit.

Figure 3:
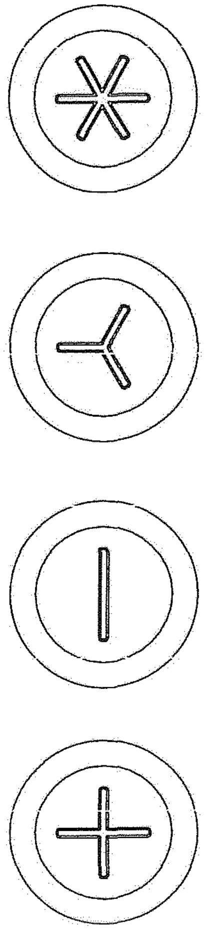
FIG. 3 shows examples of cross slit valves that may be used.

In FIG. 3 possible arrangements of slits in the cross-slit valves are presented. The slit valves per-se are known. Valves are moulded and may be made of elastomer material. Slits can be cut in a shape of a cross, of a line, of a three-pointed star, of a six-pointed star or any other appropriate form. The cross-slit valves can differ in shapes, as presented in the figure with the concave round shape, duck-bill shape and similar.

Figure 4:
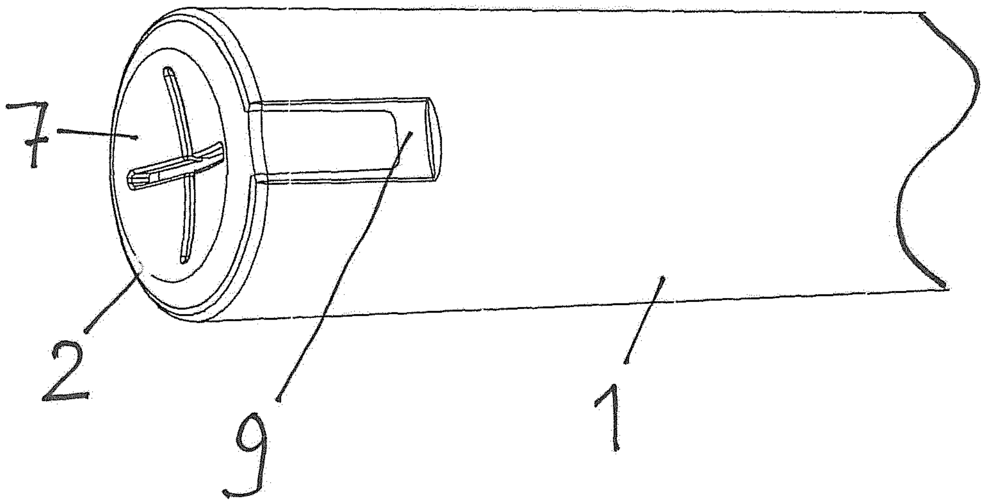
FIG. 4 shows a perspective view of an example of an inlet valve.
Figure 5:
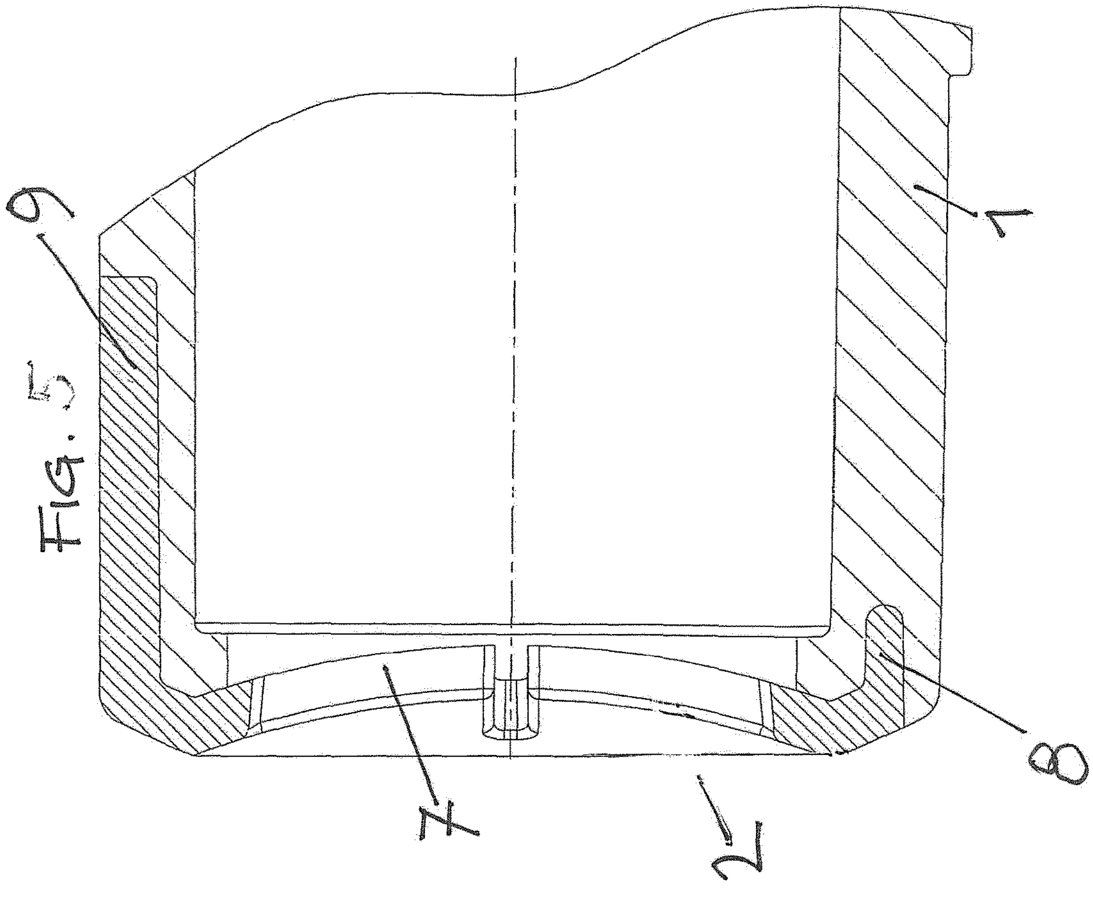
FIG. 5 shows the inlet valve of FIG. 4. in cross-section.

An inlet valve 2 according to the present disclosure is presented in FIGS. 4, 5. As shown it may be integrally formed, for example connected and melded, or co-moulded, to the lower end of the straw body 1. Straw body 1 may be made of thermoplastic and the valve 2 with a membrane 7 that may be made of an elastomer, such as a thermoplastic elastomer. Other materials that can be co-moulded to the straw body. The membrane 7 of the inlet valve is bent towards the inside of the straw body 1, i.e. the membrane 7 is concave.

In an arrangement, the material used to form the straw body may be transparent or translucent. In use, this may enable the user to confirm that all of the product within the straw has been consumed.

In an arrangement, one or both of the inlet valve 2 and the outlet valve 3 may be formed in a distinctive colour. If both the inlet valve 2 and the outlet valve 3 are coloured they may have different distinctive colours. Arrangements with one or more valve having a distinctive colour may assist in indicating to users the correct orientation of the pre-filled straw in use. For example, user instructions may include a pictogram that uses the one or more coloured valves to clearly indicate the end to be inserted in the mouth and the end to be inserted in a liquid.

Alternatively or additionally, markings may be provided on the straw body to indicate correct orientation of the straw for use and/or the direction of liquid flow in use. Such markings may be applied to the straw body by any appropriate means, including printing on the straw body, application of stickers and the inclusion of surface patterns within the mould design.

The edge of the straw body 1 may be shaped to enable larger surface of the connection between the straw body 1 and the inlet valve 2. The said shape is preferably a recess, such as an indent or groove 8, formed inside the edge of the wall of the straw body 1. To enable the injection of the thermoplastic into the valve-shaped mould, a tongue-shaped groove 9 may be formed on the surface side on the end of the straw body 1. Said groove 9 enables that the injected thermoplastic flows from the injection unit to fill in the valve 2 mould.

Figure 6:
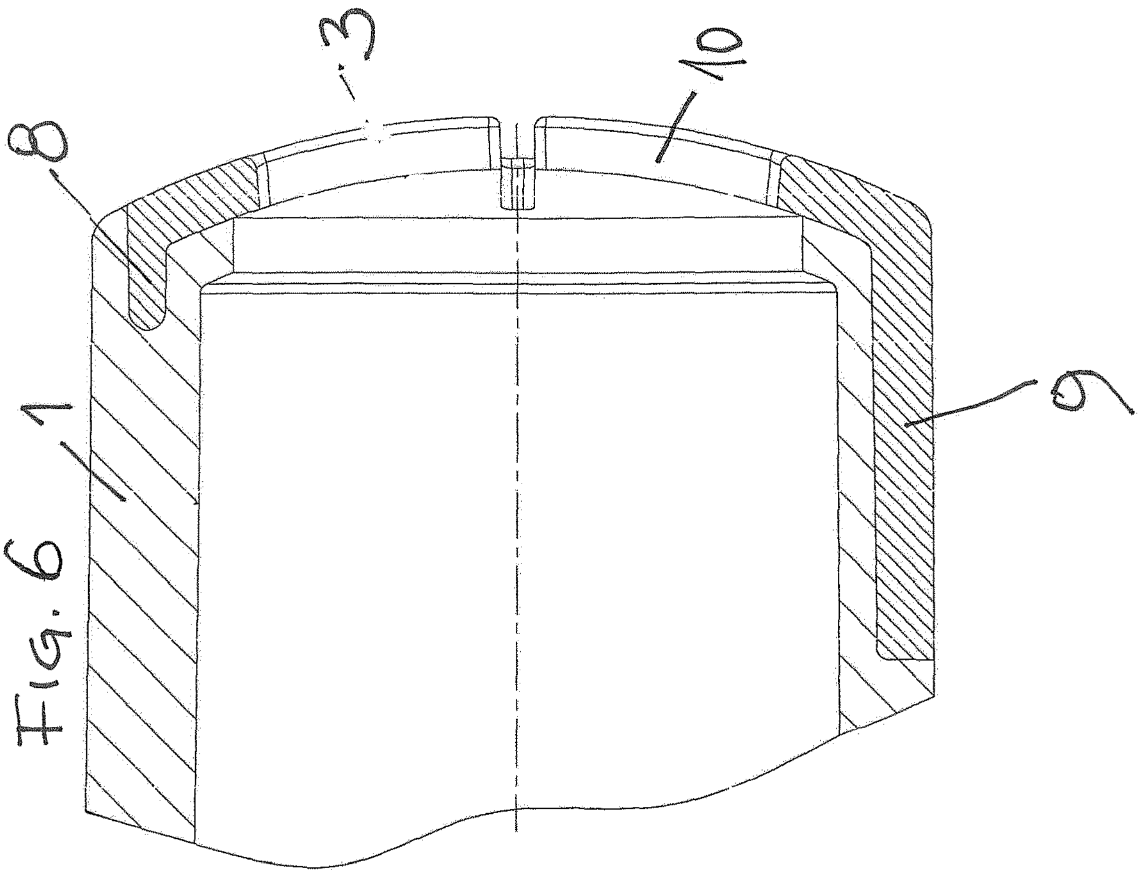
FIG. 6 shows an example of an outlet valve in cross-section.

An outlet valve 3 is presented in FIG. 6 and may have generally the same structure as the inlet valve 2. The outlet valve 3 is bent towards the outside of the straw body 6, i.e. the membrane 10 is convex.

The inlet and outlet valves 2, 3 with the membranes 7, 10 may be injection-moulded directly onto respective straw segments of the main straw body 1. As discussed above, the straw body may have a groove 8. During the injection moulding process, when the elastomer is injected onto the straw body 1, a junction between both materials, i.e. the thermoplastic of the straw body 1 and the elastomer of valves 2, 3, is formed by the adhesive molecular forces. The provision of the groove may increase the area of this contact.

Figure 7:
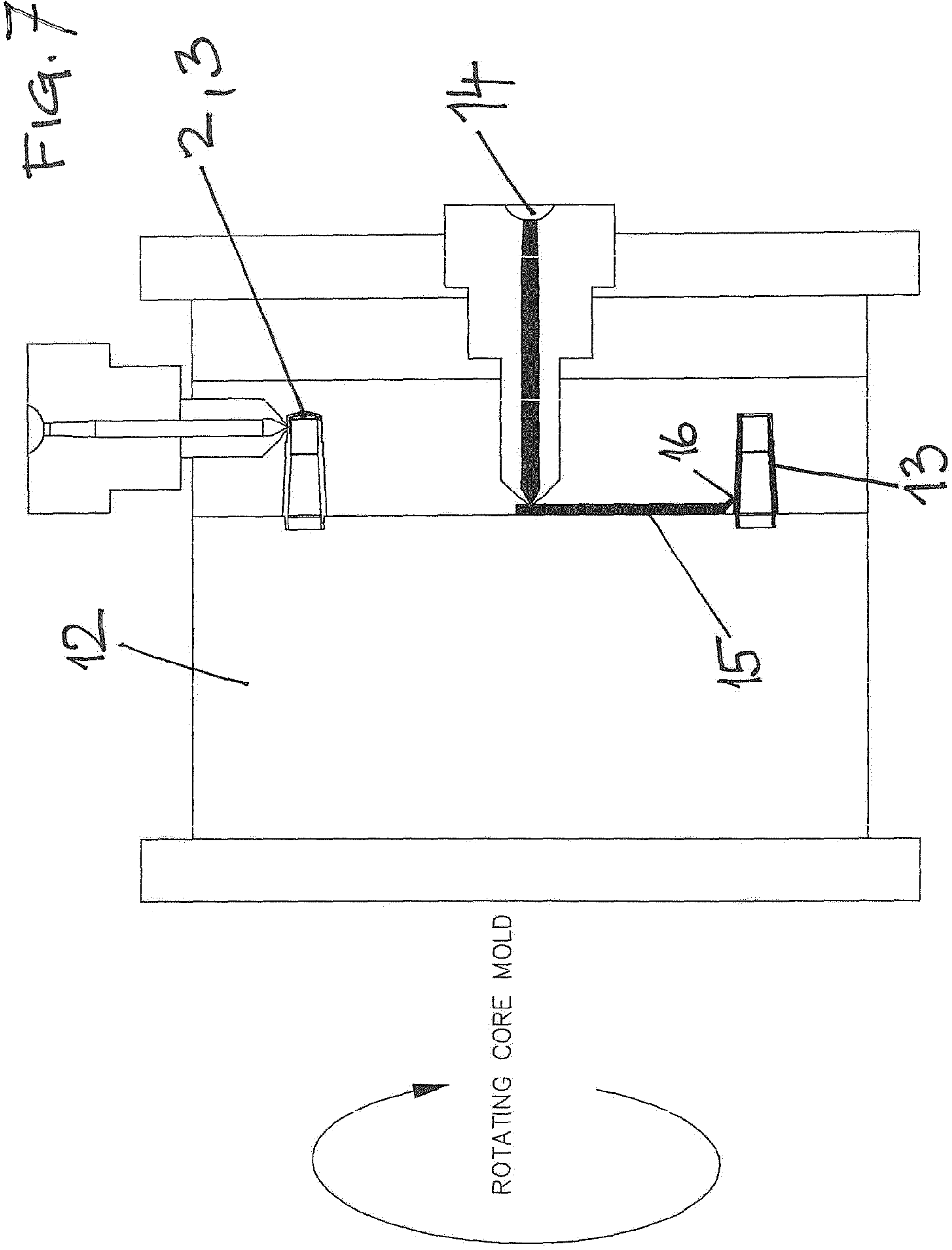
FIG. 7 shows injection moulding of a straw body.
Figure 8:
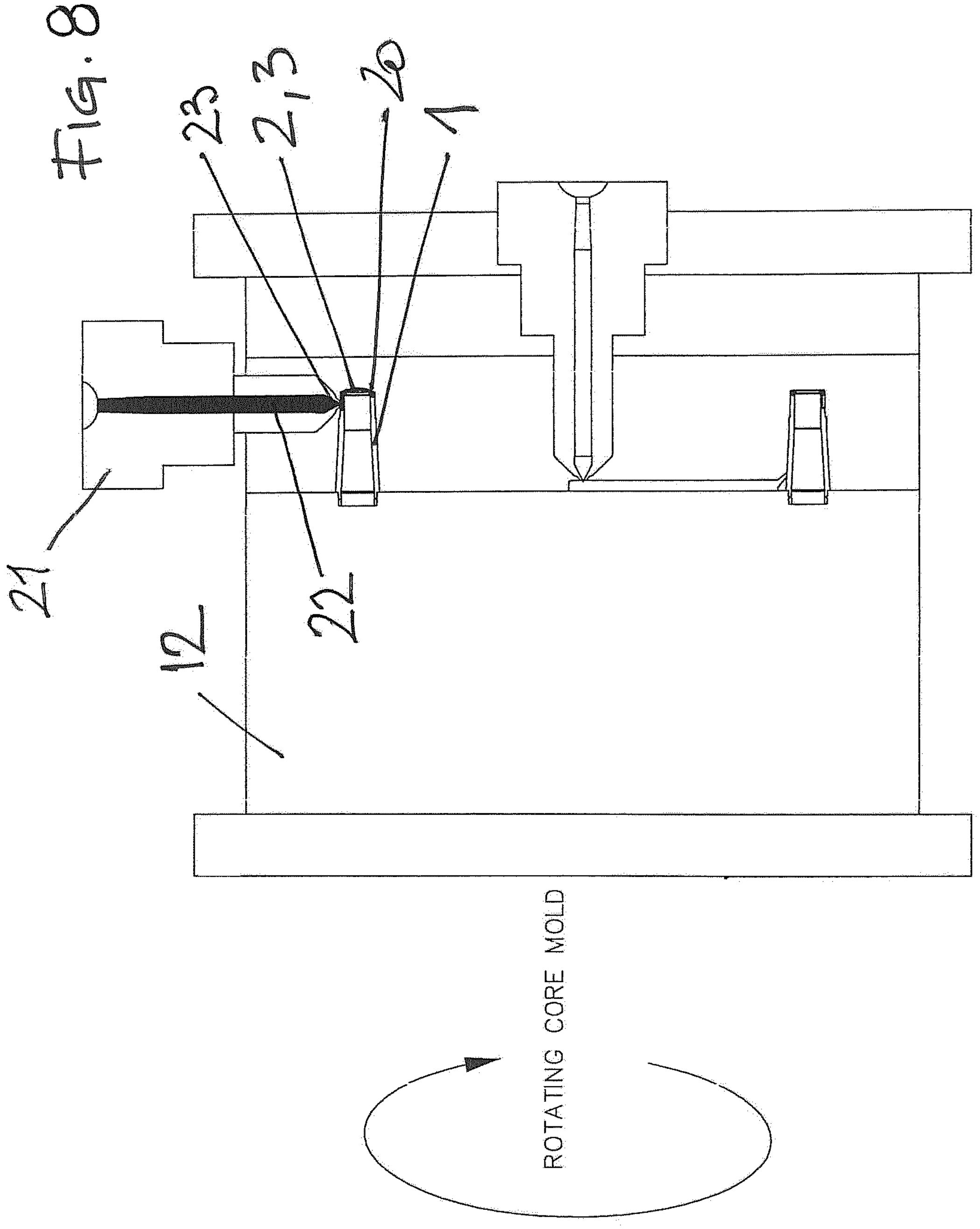
FIG. 8 shows injection moulding of a valve.

FIGS. 7 and 8 depict a two component, i.e. thermoplastic and elastomer, injection moulding process. The process is performed by injecting the first component, preferably polymer, into the mould 12. In the first step the first component is injected thorough the injection nozzle 14 into the channel 15. Then the first component flows through the gate 16 to the appropriate cavity 13 in the shape of straw body segment 1. The flow enters the mould 12 through the gate 16 into the groove 9. In this cavity 13 the straw body 1 is formed. After this process is completed, the mould 12 changes the configuration in order to initiate the second step of the process.

Before the polymer is cooled-off or is hardened, the tooling configuration is changed, i.e. the mould 12 rotates and changes the configuration in order to initiate the second step of the process. Then follows the injection of the second material, preferably elastomer into the cavity and thus cross slit valve is moulded onto the straw body. In this way the valves and straw are attached by molecular adhesion. This approach allows the production cycle time to be shortened.

In the second step as presented in FIG. 8 the already formed straw body 1 comes in contact with the second cavity 20. The second cavity 20 is in the shape of the valve 2, 3. The second component, preferably elastomer, is injected form the injection nozzle 21 through the second channel 22 and enters the cavity 20 through the gate 23. After cooling the finished piece is ejected from the mould 12.

In an arrangement, the straw bodies may be formed with a tapered shape. In particular the straw bodies may be arranged such that the cross-sectional area of the opening within the straw is smaller at the end having the cross-slit valve than its other end, namely the end that may be coupled to another straw segment. The latter end may be generally open, in contrast to the end that is closed by the cross-slit valve. Such an arrangement may facilitate the removal of the straw segment from the mould once formation of the straw segment is completed. In an arrangement one or both of the straw segments having cross-slit valves integrally formed at one end may have a frustro-conical shape.

With the said moulding process several straw sections are produced which later are to be coupled together to form a straw, as described above.

In particular, the pre-filled straw may be prepared by placing a product to be orally administered within a first straw segment that has an integrally formed cross-slit valve such as discussed above. Next, a second straw segment that has an integrally formed cross-slit valve may be coupled to the first straw segment. Such a process may be easier than previously known processes for preparing a pre-filled straw because it may preclude the need to attach a valve to a straw that contains a product to be orally administered. This may reduce spillage of the product during the process and/or reduce costs.

In an arrangement, when the product is being placed in the first straw segment, the integrally formed valve of the first segment may prevent loss of the product from the first straw segment. For example, during the process of placing the product within the first straw segment, it may be held with the integrally formed valve below the other end such that, to the extent that the product flows, it flows towards the integrally formed valve, which prevents the product leaving the straw segment. Once the second straw segment has been coupled to the first straw segment, the product may prevented from leaving the straw in either direction (when the straw is not in use) by the integrally formed valves at either end of the pre-filled straw.

It should be appreciated that other arrangements for filling the straw may be possible. For example, the product could be placed in two straw segments with integrally formed valves before the two straw segments are coupled. This may require steps to prevent the product falling out of one or both straw segments during coupling.

In any case, it should be appreciated that, although in preparation of the pre-filled straw the product may be placed initially in one straw segment, once the pre-filled straw has been prepared, the product may partially or completely transfer to another straw segment before use.

The product within the pre-filled straw may be any product that can be conveyed by a fluid passing through the straw. For example it may included a liquid soluble powder or granules. Alternatively or additionally the product may include powder, granules or other particulates configured to be entrained in a fluid passing through the straw. Alternatively or additionally, the product may be a liquid that is entrained with and diluted by a liquid passing through the straw.

In an arrangement, after the product has been placed in the straw and the straw segments coupled together, packaging may be added. The packaging may be an enclosure that completely surrounds one or more pre-filled straws and/or may cover one or both of the integrally formed cross-slit valves. Such packaging may prevent accidental leakage of the product from the pre-filled straw before use. The packaging may be child-proof packaging.

According to the arrangements disclosed above a very good prevention against the loss of the straw content is obtained, since both of the cross-slit valves are closed in the time of non-use. The loss of the content during suction is also prevented, as the outlet valve inhibits counter pressure applied into the straw, and inlet valve prevents the loss of the liquid from the straw.

The invention claimed is:

1. A pre-filled straw to be used for oral administration of a product, the pre-filled straw comprising:

a first cylindrical straw segment defining a first central channel which contains the product, the first cylindrical straw segment further comprising:

a first end having a first membrane extending across the first central channel, the first membrane including a first integrally formed cross-slit valve; and a second end open to the first central channel; and a second cylindrical straw segment defining a second central channel, the second cylindrical straw segment further comprising:

a third end having a second membrane extending across the second central channel, the second membrane including a second integrally formed cross-slit valve; and a fourth end open to the second central channel, wherein the second end of the first cylindrical straw segment and the fourth end of the second cylindrical straw segment are detachably coupled to one another.

2. The pre-filled straw according to claim 1, wherein one or both of the first and second cylindrical straw segments are tapered such that a cross-sectional area of the respective first or second central channels of one or both of the first and second cylindrical straw segments is smaller at the first or third end than at the second or fourth end.

3. The pre-filled straw according to claim 2, wherein one or both of the first and second cylindrical straw segments has a frusto-conical shape.

4. The pre-filled straw according to claim 1, wherein the first cylindrical straw segment is directly coupled to the second cylindrical straw segment.

5. The pre-filled straw according to claim 1, wherein the first cylindrical straw segment is coupled to the second cylindrical straw segment by one or more of a snap-fit connection, a press-fit connection, and a friction fit connection.

6. The pre-filled straw according to claim 1, wherein the first and second cylindrical straw segments each have an integrally formed element at the second or fourth ends, respectively, the integrally formed elements configured to enable the first and second cylindrical straw segments to be coupled to one another.

7. The pre-filled straw according to claim 1, wherein the first and second integrally formed cross-slit valves are co-molded to the first and third ends of the first and second cylindrical straw segments, respectively.

8. The pre-filled straw according to claim 1, wherein the first and second membranes are formed from a thermoplastic elastomer material.

9. The pre-filled straw according to claim 8, wherein one of the first and second membranes has a convex shape.

10. The pre-filled straw according to claim 9, wherein the other of the first and second membranes has a concave shape.

11. The pre-filled straw according to claim 1, wherein one or both of the first and second cylindrical straw segments comprise a straw body having a bonding surface to which the respective first or second integrally formed cross-slit valve is attached by molecular adhesion.

12. The pre-filled straw according to claim 11, wherein the straw body is formed from a thermoplastic material and one or both of the first and second integrally formed cross-slit valves is formed from a different material.

13. The pre-filled straw according to claim 11, wherein the bonding surface has at least one recess configured to increase an area of contact between the straw body and one or both of the first and second integrally formed cross-slit valves.

14. A process of preparing the pre-filled straw according to claim 1, comprising:

placing the product to be orally administered to a user within the first central channel of the first cylindrical straw segment; and detachably coupling the second end of the first cylindrical straw segments to the fourth end of the second cylindrical straw segment.

15. The process according to claim 14, wherein, from the time that the product is placed in the first cylindrical straw segment until the second cylindrical straw segment is coupled to the first cylindrical straw segment, the product is retained in the first central channel of the first cylindrical straw segment by the first integrally formed cross-slit valve.

16. The process according to claim 14, wherein the first cylindrical straw segment is formed with the first integrally formed cross-slit valve before the product is placed in the first cylindrical straw segment.

17. The process according to claim 14, wherein the second cylindrical straw segment is formed with the second integrally formed cross-slit valve before the second cylindrical straw segment is coupled to the first cylindrical straw segment.

18. The process according to claim 14, wherein one or both of the first and second cylindrical straw segments are formed by:

forming a straw body; and subsequently co-molding a cross-slit valve on an end of the straw body such that the cross-slit valve is integrally formed.

19. The process according to claim 18, wherein the material used to form the straw body is different from the material used to form one or both of the first and second integrally formed cross-slit valves.

20. The process according to claim 18, wherein one or both of the first and second integrally formed cross-slit valves is formed from a thermoplastic elastomer.

21. The process according to claim 18, wherein the straw body is formed from a thermoplastic.

* * * * *